(12) United States Patent
Hirose

(10) Patent No.: US 8,869,311 B2
(45) Date of Patent: Oct. 21, 2014

(54) DISPLACEMENT DETECTION MECHANISM AND SCANNING PROBE MICROSCOPE USING THE SAME

(75) Inventor: Ryusuke Hirose, Chiba (JP)

(73) Assignee: SII NanoTechnology Inc. (JP)

( * ) Notice: Subject to any disclaimer, the term of this patent is extended or adjusted under 35 U.S.C. 154(b) by 107 days.

(21) Appl. No.: 13/409,255

(22) Filed: Mar. 1, 2012

(65) Prior Publication Data
US 2012/0227138 A1   Sep. 6, 2012

(30) Foreign Application Priority Data
Mar. 3, 2011 (JP) ................... 2011-046806

(51) Int. Cl.
 *G01Q 60/00* (2010.01)
 *G01Q 60/30* (2010.01)
 *G01Q 20/00* (2010.01)
 *B82Y 35/00* (2011.01)

(52) U.S. Cl.
CPC ............. *G01Q 20/00* (2013.01); *G01Q 60/30* (2013.01); *B82Y 35/00* (2013.01)
USPC ................... 850/1; 850/21; 73/105

(58) Field of Classification Search
CPC ...................................... G01Q 60/00
USPC .............................................. 850/1
See application file for complete search history.

(56) References Cited

U.S. PATENT DOCUMENTS

| | | | |
|---|---|---|---|
| 6,909,221 B2* | 6/2005 | Ayazi et al. | 310/321 |
| 8,252,598 B2* | 8/2012 | Koley et al. | 436/149 |
| 2007/0197176 A1* | 8/2007 | Kobayashi et al. | 455/205 |
| 2008/0047335 A1 | 2/2008 | Kawasaki et al. | 73/105 |
| 2009/0021747 A1 | 1/2009 | Kawasaki et al. | 356/501 |

FOREIGN PATENT DOCUMENTS

| | | |
|---|---|---|
| JP | 05187866 | 7/1993 |
| JP | 11030622 | 2/1999 |
| JP | 2002116132 | 4/2002 |
| JP | 2005265435 | 9/2005 |
| JP | 2006284363 | 10/2006 |
| JP | 2008051602 | 3/2008 |
| JP | 2008076221 | 4/2008 |
| JP | 2008241619 | 10/2008 |
| JP | 2009025126 | 2/2009 |

* cited by examiner

Primary Examiner — Phillip A Johnston
(74) Attorney, Agent, or Firm — Adams & Wilks

(57) ABSTRACT

A displacement detection mechanism for a vibrationally driven cantilever includes a vibration frequency detector comprised of an LC resonator that detects a change of capacitance between the cantilever and a sample surface due to a change of vibration of the cantilever, and an F-V converter or an FM demodulator that detects a voltage based on the vibration frequency, whereby displacement of the cantilever can be detected. The displacement detection mechanism can be used in a scanning probe microscope to perform shape measurement and physical property measurement without the presence of light.

10 Claims, 4 Drawing Sheets

DISPLACEMENT DETECTION MECHANISM AND SCANNING PROBE MICROSCOPE USING THE SAME

BACKGROUND OF THE INVENTION

1. Field of the Invention

The present invention relates to a displacement measuring method for measuring a displacement of a cantilever accurately, and more particularly, to a scanning probe microscope that can observe, by using the method, a surface shape or physical property information of a sample by scanning a surface of the sample with a probe.

2. Description of the Related Art

The scanning probe microscope (hereinafter, referred to as SPM) is a microscope for measuring a surface shape or physical property information of a sample, and there are proposed various measuring modes of the SPM. For instance, there are a scanning tunneling microscope (hereinafter, referred to as an STM) that maintains a tunnel current flowing between the probe and the sample to be constant so as to obtain the surface shape, and an atomic force microscope (hereinafter, referred to as AFM) that detects an atomic force between the probe and the sample so as to obtain the surface shape. Among the AFMs, there are a contact mode in which bending of the cantilever is maintained to be constant so as to obtain the surface shape, and a dynamic force mode (hereinafter, referred to as DFM mode) in which the cantilever is vibrated and its amplitude is maintained to be constant so as to obtain the surface shape. Usually, the probe and the sample are brought into contact with each other constantly in the contact mode and intermittently in the DFM mode.

In the SPM, it is possible to perform physical property measurement in which the sample surface shape and the physical property information of the sample are obtained simultaneously. In particular, through the use of a conductive cantilever having a metal coated probe, it is possible to measure an electrical property of the sample surface. For instance, there are a Kelvin probe force microscopy (hereinafter, referred to as KFM) for observing a surface potential of the sample, an electric force microscopy (hereinafter, referred to as EFM) for measuring an electric force, and a magnetic force microscopy (hereinafter, referred to as MFM) that can observe a magnetic characteristic. In each measuring method, the probe is kept not in contact with the sample so that physical interactive action between the probe and the sample surface is detected as a displacement of the cantilever (for example, see Takeharu Yamaoka, Material Technology, Vol. 23, No. 4 (2005) 211).

It is possible to measure various types of physical property information of the sample surface in a state in which the probe is brought into contact with the sample, namely in a contact mode state. For instance, there is a scanning nonlinear dielectric microscopy (hereinafter, referred to as SNDM) that can measure a capacitance change of the sample surface. The SNDM measures a capacitance change of the sample when an AC voltage is applied between the conductive cantilever and the sample. As a method of measuring the capacitance change, a conductive cantilever is attached to an LC resonator, and a change of capacitance just below the probe is converted into a change of resonance frequency of the LC resonator. Further, the change of resonance frequency is converted into a change of voltage by an FM demodulator or the like, to thereby detect the capacitance change as the change of voltage (for example, see Japanese Patent Application Laid-open No. Hei 8-75806).

On the other hand, as a method of detecting the displacement of the cantilever, an optical cantilever method is usually used. As the optical cantilever method, there is a method in which light such as a laser beam is applied to a back surface of the cantilever, and a position of reflected light thereof is detected so that bending (displacement) of the cantilever can be detected. As a method of not using light, there is a piezoresistance type self-detecting cantilever using piezoresistance. In this type, a piezoresistive strain sensor is mounted on the cantilever so that bending of the cantilever can be detected as a resistance of the piezoresistor (for example, see Japanese Patent Application Laid-open No. 2007-532923).

In the AFM, it is usual to use the optical cantilever method for detecting a displacement of the cantilever. However, because light is applied to the sample too, the physical property measurement may be affected by the light. In particular, when a potential or current of the sample surface is measured, the sample itself may change its physical property value by photoexcitation or the like so that accurate physical property information cannot be measured. In addition, for the same reason, it may be difficult to irradiate the sample with light so as to measure a change of physical property information of the sample between presence and absence of the light.

On the other hand, the method of using the piezoresistance type self-detecting cantilever does not use light for measuring a displacement of the cantilever, and hence the method does not have the above-mentioned influence. However, there are various restrictions when the electrical property is measured with the KFM or the like. For instance, the cantilever to be used should have a piezoresistor so that a complicated structure and a special manufacturing process are necessary. As a matter of course, a usual cantilever available in the market cannot be used. In addition, in the electrical property measurement, a conductive cantilever having a metal coated probe is usually used, but the piezoresistance type self-detecting cantilever having a metal coated probe requires a more complicated structure and manufacturing process, and hence there is difficulty in manufacturing the cantilever itself. In addition, in the method such as the KFM or the EFM in which an alternating electric field is applied between the sample and the probe, the applied alternating electric field is also applied to the piezoresistance sensor. As a result, the displacement current generated in the piezoresistor may be mixed into a displacement signal of the lever as noise, and hence accurate measurement cannot be performed. Concerning this point, there is reported a measurement example of the KFM utilizing a phase difference between an alternating electric field affecting the piezoresistance sensor and an alternating electric field affecting between the probe and the sample, but a structure of the apparatus is complicated, and the resolution is low (see M.Takahashi, T. Igarashi, T. Ujihara and T. Takahashi: "Photovoltage Mapping on Polycrystalline Silicon Solar Cells by Kelvin Prove Force Microscopy with Piezoresistive Cantilever", Jpn. J. Appl. Phys., 46, 548 (2007)).

SUMMARY OF THE INVENTION

A scanning probe microscope of the present invention is aimed to solve the above-mentioned problems, and it is an object of the present invention to provide a novel displacement detection mechanism that is different from the conventional method of detecting a displacement of a cantilever of the optical cantilever method or self-detection type detection method, and a scanning probe microscope using the displacement detection mechanism.

According to the present invention, there is provided a displacement detection mechanism for a cantilever, for detecting a displacement of a cantilever that generates a certain vibration in a direction opposed to a reference surface, the displacement detection mechanism including capacitance change detection means that detects a change of capacitance between the cantilever and the reference surface due to a change of vibration of the cantilever, in which the displacement of the cantilever is evaluated based on the change of capacitance. With this structure, a defect of the optical cantilever method or the self-detection method can be eliminated.

In addition, in the present invention, a capacitance sensor is used as the capacitance change detection means.

In addition, in the present invention, a change of resonance frequency of an LC resonator based on a capacitance change is evaluated as a change of voltage using, as another capacitance change detection means, the LC resonator and an F-V converter, or the LC resonator and an FM demodulator.

In addition, in the present invention, a scanning probe microscope includes a displacement detection portion using the above-mentioned displacement detection mechanism.

In addition, in the present invention, in the scanning probe microscope including the displacement detection portion using the above-mentioned displacement detection mechanism, the displacement detection portion is capable of detecting a vibration amplitude and a phase of the cantilever. With this structure, the present invention can be applied to a scanning probe microscope having different measuring modes. In addition, in the present invention, shape measurement and physical property measurement can be performed in a state in which light is blocked. Because there is no influence of photoexcitation, it is possible to compare a change of sample shape or physical property information between presence and absence of the light.

According to the scanning probe microscope of the present invention, it is possible to detect a displacement of the cantilever as a change of capacitance between a lever portion of the cantilever and the sample.

With this structure, because light is not used unlike the optical cantilever method, there is no influence of light, and it is possible to obtain true physical property information of the sample to be measured. In addition, it is possible to observe a change of physical property information of the sample between presence and absence of the light, and a change of physical property information of the sample due to a difference of light intensity or light frequency.

In addition, it is not necessary for the cantilever to be equipped with a piezoresistance sensor in the self-detection type, and hence a general purpose cantilever available in the market (including a conductive cantilever) can be used. Further, even if the cantilever is in an electric field, the cantilever is not affected by the electric field because the cantilever has no piezoresistance sensor. Therefore, it is possible to easily perform the electrical property measurement with the KFM or the EFM.

DETAILED DESCRIPTION OF THE PREFERRED EMBODIMENTS

A scanning probe microscope of the present invention is described with reference to the attached drawings.

Figure 1:
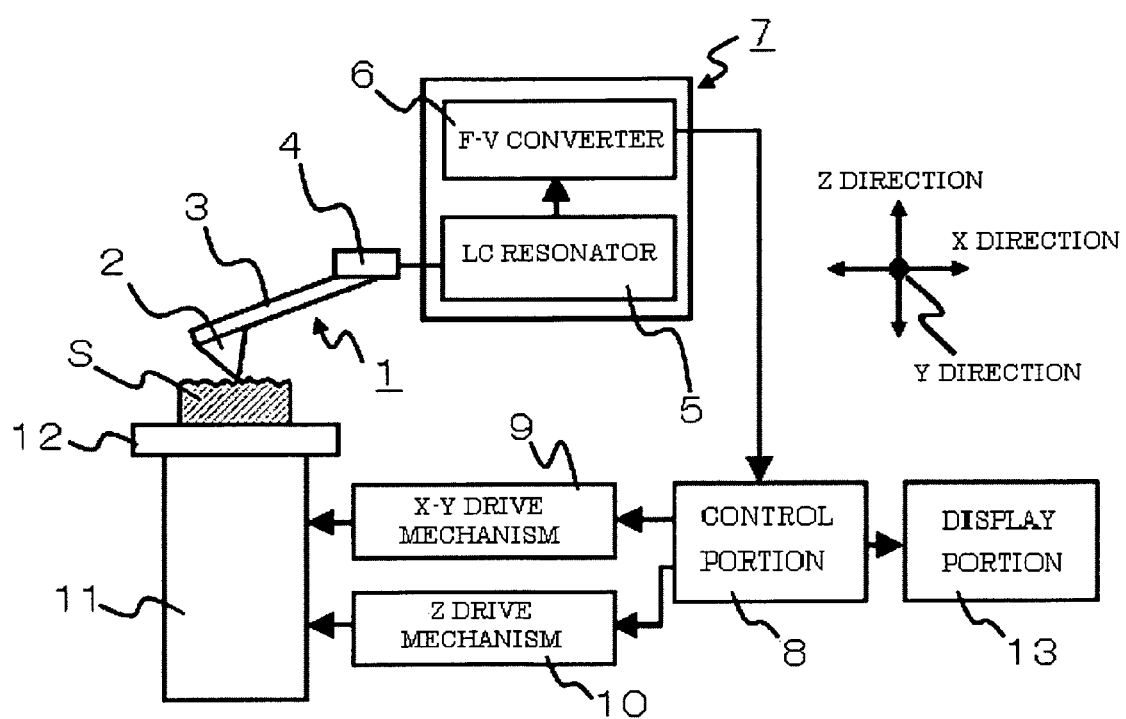
FIG. 1 is a schematic block diagram of a scanning probe microscope according to a first embodiment of the present invention.

FIG. 1 illustrates an example of a structure of the scanning probe microscope according to a first embodiment of the present invention.

The scanning probe microscope of the present invention includes a cantilever 1 that has a probe 2 whose tip is disposed to be opposed to a sample surface S of a sample placed on a sample table 12 and can perform scanning relatively to the sample surface S in X and Y directions parallel to the sample surface S and move in a Z direction perpendicular to the sample surface S, cantilever vibrator means 4 that can vibrate the cantilever 1, and a cantilever displacement detection portion 7 that detects a displacement of the cantilever 1. The sample table 12 or the sample S placed thereon defines a reference surface of the cantilever 1, and a capacitance between the cantilever 1 and a surface of the sample S or the sample table 12 is important.

The sample table 12 is attached to a three-dimensional actuator 11, and can move the probe 2 and the sample surface S relatively in the X and Y directions and in the Z direction.

The three-dimensional actuator 11 is connected to an X-Y drive mechanism 9 and a Z drive mechanism 10 for driving the three-dimensional actuator 11 to scan the sample surface S in the X, Y, and Z directions.

In addition, the X-Y drive mechanism 9 and the Z drive mechanism 10 are connected to a control portion 8 and are controlled by the control portion 8.

The cantilever displacement detection portion 7 includes an LC resonator 5 and an F-V converter 6. When the cantilever 1 is displaced, a capacitance between the cantilever 1 and the sample surface S (or capacitance between the cantilever 1 and the sample table 12) is changed. Through the detection of this change of capacitance, a displacement of the cantilever 1 is detected.

Specifically, the LC resonator 5 is connected to the cantilever 1 and detects (recognizes) a change of the capacitance as a change of resonance frequency of the LC resonator 5. This change of the resonance frequency is detected (recognized) by the F-V converter 6 and is detected as (converted into) a change of voltage, which is sent to the control portion 8. In other words, "displacement of the cantilever" is sequentially converted into "change of capacitance", "change of resonance frequency ", and "change of voltage" so that the displacement of the cantilever is detected.

Next, a method of calculating a change of capacitance between the cantilever and the sample surface is described.

Figure 2A:
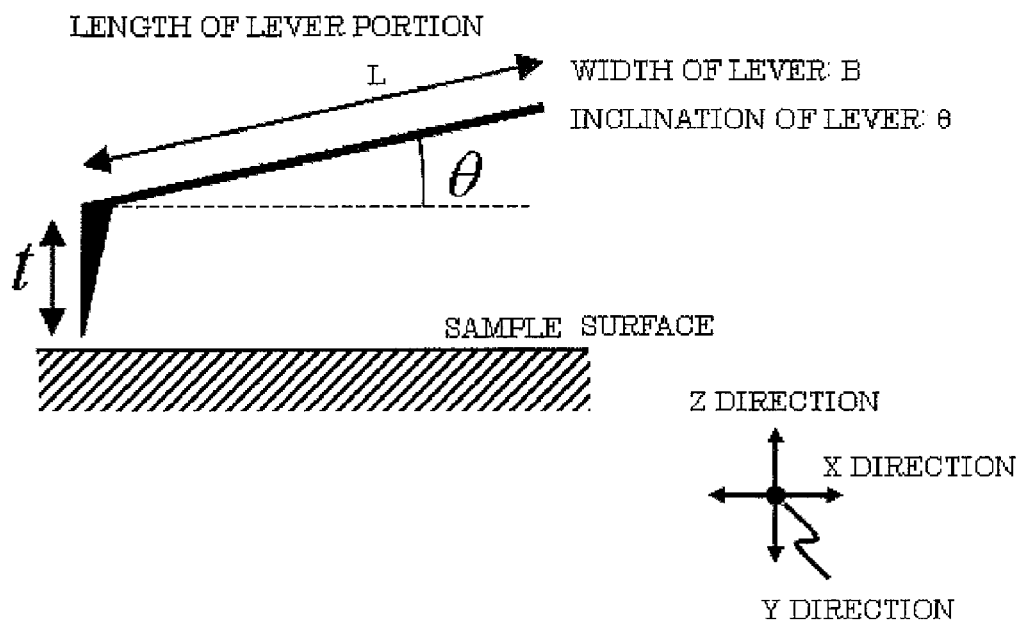
FIG. 2A is a diagram illustrating capacitance between a cantilever and a sample.
Figure 2B:
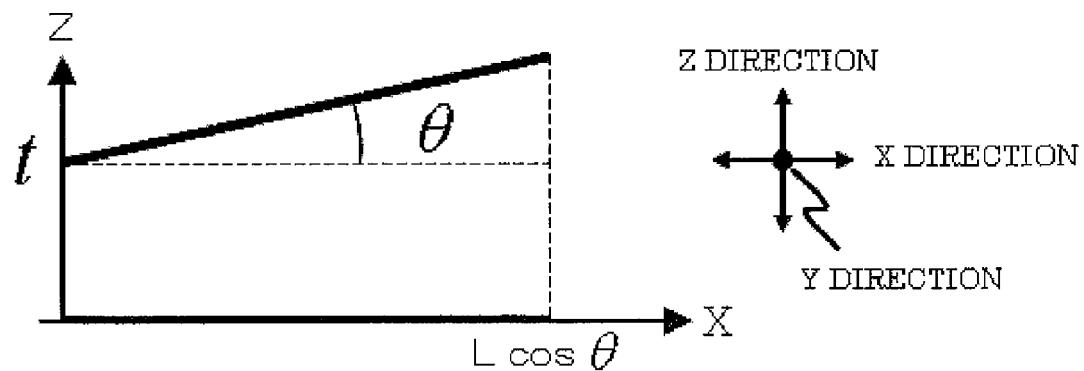
FIG. 2B is a diagram illustrating the capacitance between the cantilever and the sample regarding as a parallel plate capacitor.

Supposing that the cantilever and the sample surface illustrated in FIG. 2A constitute a parallel plate capacitor illustrated in FIG. 2B, the capacitance is expressed by the following Equation 1.

$$C = \int_0^{L\cos\theta} \frac{\varepsilon_0 b}{t + x\tan\theta} dx \qquad \text{[Equation 1]}$$

$$= \frac{\varepsilon_0 b}{\tan\theta} \int_0^{\infty} \frac{1}{x + \frac{t}{\tan\theta}} dx$$

-continued $$= \frac{\varepsilon_0 b}{\tan\theta} \log\left(\frac{L\cos\theta\tan\theta}{t} + 1\right)$$

In this equation, a length of the lever is denoted by L, a width of the lever is denoted by b, an inclination of the lever is denoted by θ, and a length of the probe is denoted by t. Supposing a general cantilever in which L=450 μm, b=30 μm, θ=13 degrees, and t=12.5 μm, and the inclination θ is changed by 0.01 degrees as a displacement of the cantilever, the change of capacitance is approximately $5\times10^{-19}$ F. The displacement detection portion 7 constituted of the LC resonator 5 and the F-V converter 6 has the same structure as the SNDM described in Japanese Patent Application Laid-open No. Hei 8-75806, but detection sensitivity of capacitance by a general SNDM is $1\times10^{-21}$ F to $1\times10^{-22}$ F. Therefore, detection sensitivity of displacement of the cantilever according to the present invention can be sufficiently realized.

As described above, the displacement information of the cantilever detected by the cantilever displacement detection portion 7 is sent to the control portion 8. The control portion 8 can perform shape measurement of the sample surface based on the received signal. For instance, general DFM measurement can be performed by detecting a vibration amplitude of the cantilever and controlling a distance between the probe and the sample so that the vibration amplitude is constant. In addition, when an alternating electric field is applied between the probe and the sample, the cantilever is vibrated by Kelvin force, and KFM measurement and EFM measurement can be performed by detecting the vibration by the cantilever displacement detection portion 7. In addition, as for displacement information of the cantilever detected by the cantilever displacement detection portion 7, for example, an amplitude may be detected by effective value to DC (RMS-DC) conversion, or an arbitrary frequency component may be detected in a synchronous manner by a lock-in amplifier. The former RMS-DC conversion is used mainly for the DFM measurement, and the latter lock-in amplifier is used for the KFM or the EFM measurement in many cases.

Note that, the F-V converter 6 is used for converting a frequency into a voltage in this embodiment, but, for example, the FM demodulator may be used without limiting to the F-V converter 6.

In addition, in this embodiment, the LC resonator 5 and the F-V converter 6 are used for detecting a change of capacitance, but a detector such as a capacitance sensor that can detect capacitance may be used without limiting to the LC resonator 5 and the F-V converter 6.

Figure 3:
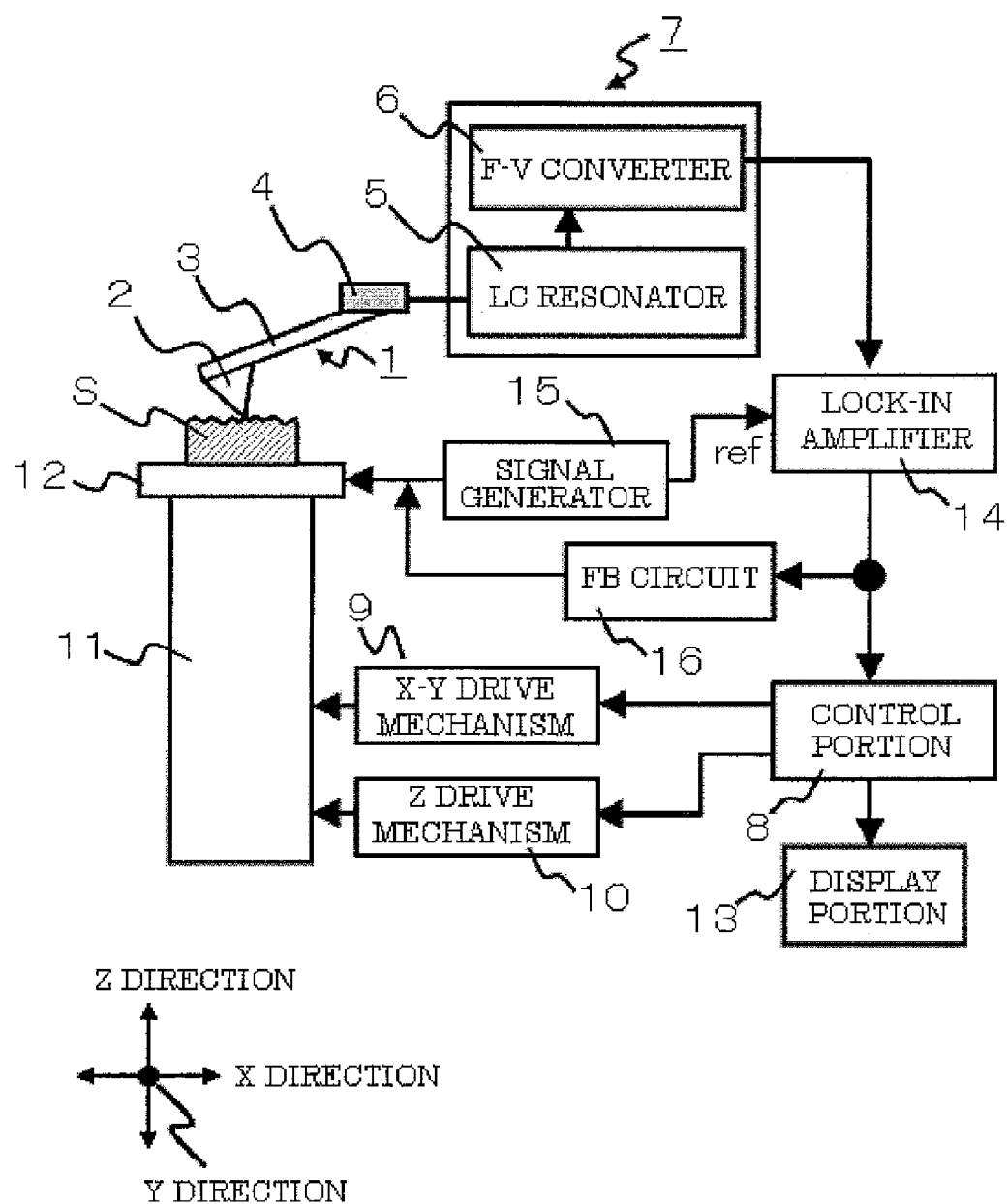
FIG. 3 is a schematic block diagram of a scanning probe microscope according to a second embodiment of the present invention.

FIG. 3 illustrates an example of a structure of a scanning probe microscope according to a second embodiment of the present invention.

The sample table 12 is connected to a signal generator 15 for applying an alternating electric field between the probe and the sample. In addition, the displacement information of the cantilever detected by the cantilever displacement detection portion 7 is sent to a lock-in amplifier 14 so that an amplitude and phase of the same frequency component as that of the signal generator 15 or twice or more of the frequency component of the signal generator 15 can be detected in a synchronous manner. The amplitude and the phase component detected here are the vibration amplitude and the phase component of the cantilever due to an electrostatic force between the probe and the sample caused by the alternating electric field, and these signals are information obtained by the EFM measurement. In addition, the KFM measurement can be performed by applying a DC bias to the sample table 12 by a feedback circuit 16 so that the amplitude detected by the lock-in amplifier 14 becomes zero.

Figure 4:
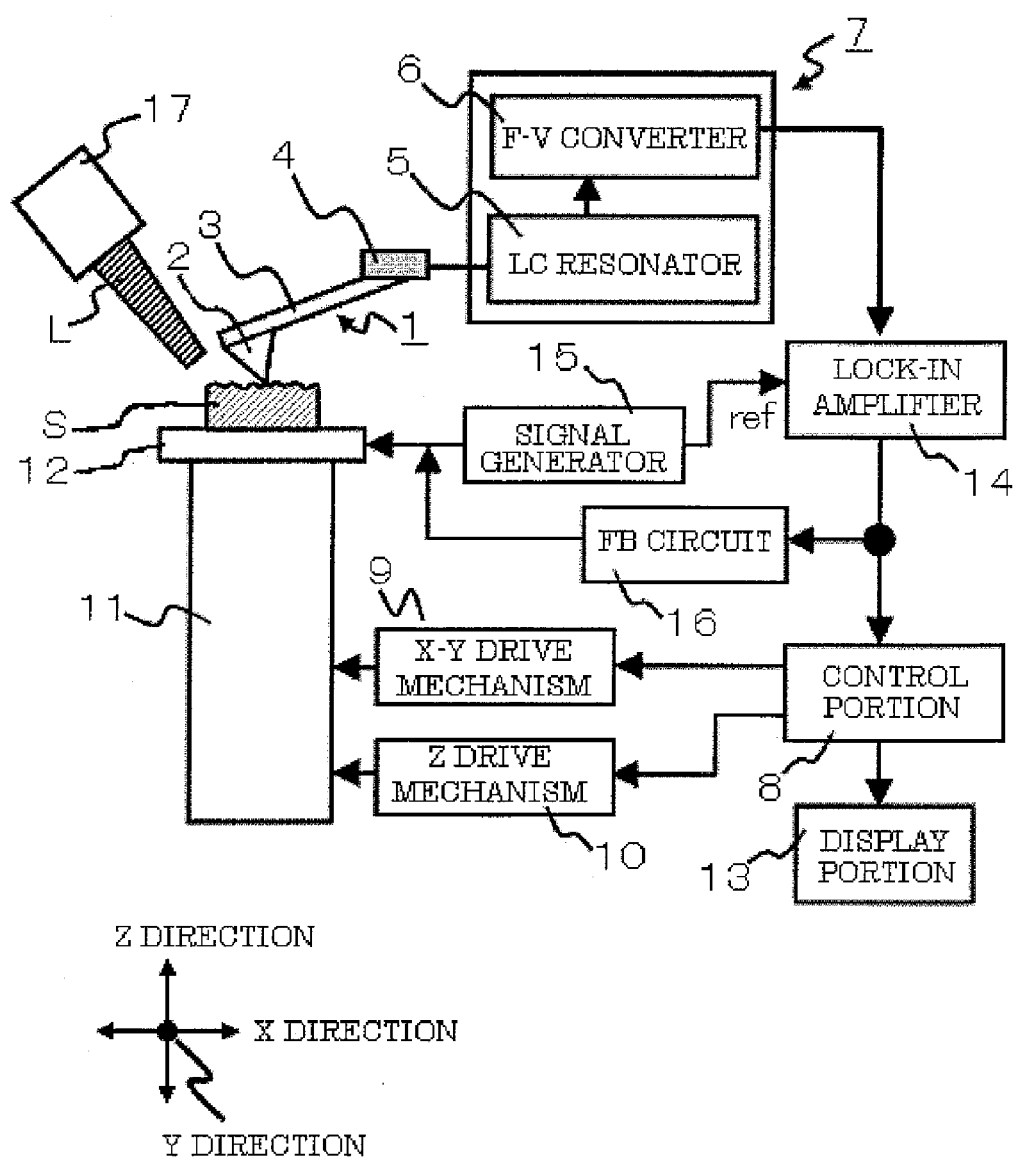
FIG. 4 is a schematic block diagram of a scanning probe microscope according to a third embodiment of the present invention.

FIG. 4 illustrates an example of a structure of a scanning probe microscope according to a third embodiment of the present invention.

The microscope includes a physical property illumination device 17 so that the sample and/or the probe are irradiated with light L. With this structure, the EFM measurement or the KFM measurement is performed in a state without illumination of the light L, and after that, the EFM measurement or the KFM measurement is performed in a state with illumination of the light L. Thus, it is possible to obtain shape information or physical property information of the sample surface between presence and absence of the light. In addition, by changing intensity of the light L by the illumination device 17, it is possible to observe a difference of results of the KFM measurement or the EFM measurement due to the intensity or a difference thereof. With this structure, light intensity dependence of the shape information or the physical property information of the sample surface can be measured.

In addition, by changing a frequency of the light by the illumination device 17, it is possible to observe a difference of results of the KFM measurement or the EFM measurement due to the frequency value or a difference thereof. Thus, it is possible to measure light frequency dependence of the shape information or the physical property information of the sample surface. Note that, the EFM measurement or the KFM measurement is used here, but the present invention is not limited thereto. It is possible to perform the shape measurement and the physical property measurement by other measuring mode of the shape measurement, the current measurement, the MFM measurement, and the like.

Note that, in the scanning probe microscope according to the present invention, the displacement of the cantilever is detected by the cantilever displacement detection portion 7, but it is possible to combine the cantilever displacement detection portion 7 with the conventional optical cantilever method. For instance, it is possible to perform the shape measurement by the optical cantilever method and to perform the EFM or the KFM measurement by the cantilever displacement detection portion 7.

What is claimed is:

1. A scanning probe microscope, comprising:
a cantilever having a probe at a tip thereof;
cantilever vibrator means for vibrating the cantilever;
a sample table on which a sample is to be placed in opposed relation to the tip of the probe;
an X-Y drive mechanism and a Z drive mechanism for driving a surface of the sample and the probe relatively to each other in an X direction and a Y direction, and a Z direction, respectively;
a cantilever displacement detection portion for detecting a displacement of the cantilever, the cantilever displacement detection portion comprising capacitance change detection means for detecting a change of capacitance between the cantilever and a reference surface due to a change of vibration of the cantilever, the capacitance change detection means comprising vibration frequency detection means for detecting a vibration frequency of the cantilever based on the change of capacitance, the vibration frequency detection means comprising
an LC resonator that is connected electrically to the cantilever and that detects a change of resonance frequency of the LC resonator based on the change of capacitance, and
electrical signal detection means for detecting an electric signal based on the detected vibration frequency, wherein the capacitance is expressed by an equation having at least three parameters including length of the probe and length and width of the cantilever, and wherein the cantilever displacement detection portion recognizes the vibration frequency of the cantilever based on the change of capacitance, and evaluates the displacement of the cantilever based on the electric signal;

a control portion for obtaining shape data and physical property data of the surface of the sample from displacement information of the cantilever detected by the cantilever displacement detection portion; and an illumination device for irradiating at least one of the surface of the sample and the probe with light, wherein the scanning probe microscope detects differences of shape and physical property information of the surface of the sample between presence and absence of the light applied from the illumination device.

2. A scanning probe microscope according to claim 1, wherein the cantilever displacement detection portion detects a vibration amplitude, a vibration frequency, and a phase of the cantilever.

3. A scanning probe microscope according to claim 1, wherein the cantilever displacement detection portion detects a vibration amplitude of the cantilever vibrated by the cantilever vibrator means, the vibration amplitude having the same frequency component as a frequency component of the cantilever vibrator means.

4. A scanning probe microscope according to claim 1, wherein the cantilever displacement detection portion detects a difference between a phase of the cantilever vibrated by the cantilever vibrator means from a phase of the cantilever vibrator means.

5. A scanning probe microscope according to claim 1, wherein the cantilever displacement detection portion detects a vibration amplitude and a phase of the cantilever vibrated by an alternating electric field applied between the surface of the sample and the probe.

6. A scanning probe microscope according to claim 5, wherein the cantilever displacement detection portion detects a vibration amplitude of the cantilever vibrated by the alternating electric field applied between the surface of the sample and the probe, the vibration amplitude having the same frequency component as a frequency component of the alternating electric field.

7. A scanning probe microscope according to claim 5, wherein the cantilever displacement detection portion detects a difference between a phase of the cantilever vibrated by the alternating electric field applied between the surface of the sample and the probe, and a phase of the alternating electric field.

8. A scanning probe microscope according to claim 5, wherein the cantilever displacement detection portion detects a vibration amplitude and a phase of the cantilever vibrated by the alternating electric field applied between the surface of the sample and the probe, the vibration amplitude and the phase having a frequency component that is at least twice or more of a frequency component of the alternating electric field.

9. A scanning probe microscope according to claim 1, wherein the scanning probe microscope detects differences of shape and physical property information of the surface of the sample due to a difference in frequency of the light applied from the illumination device.

10. A scanning probe microscope according to claim 1, wherein the scanning probe microscope detects differences of a shape and physical property information of the surface of the sample due to a difference in intensity of the light applied from the illumination device.

\* \* \* \* \*